(12) United States Patent
Wang et al.

(10) Patent No.: US 11,646,489 B2
(45) Date of Patent: May 9, 2023

(54) LIQUID CRYSTAL PHASE SHIFTER HAVING A DELAY LINE WITH A PLURALITY OF BIAS LINES ON TWO SIDES THEREOF AND AN ANTENNA FORMED THEREFROM

(71) Applicant: BOE TECHNOLOGY GROUP CO., LTD., Beijing (CN)

(72) Inventors: Xiyuan Wang, Beijing (CN); Yali Wang, Beijing (CN); Dongdong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 189 days.

(21) Appl. No.: 17/259,235

(22) PCT Filed: Mar. 27, 2020

(86) PCT No.: PCT/CN2020/081621
§ 371 (c)(1),
(2) Date: Jan. 11, 2021

(87) PCT Pub. No.: WO2021/189409
PCT Pub. Date: Sep. 30, 2021

(65) Prior Publication Data
US 2022/0140461 A1    May 5, 2022

(51) Int. Cl.
*H01Q 3/36* (2006.01)
*H01P 1/18* (2006.01)
(Continued)

(52) U.S. Cl.
CPC ............. *H01Q 3/36* (2013.01); *G02F 1/1313* (2013.01); *G02F 1/134309* (2013.01);
(Continued)

(58) Field of Classification Search
CPC .. H01P 1/181; H01P 1/184; H01P 1/18; H01P 9/00; H01Q 3/36
(Continued)

(56) References Cited

U.S. PATENT DOCUMENTS

2020/0099115 A1\* 3/2020 Sun .......................... H01P 1/184
2020/0203827 A1   6/2020 Wang et al.
(Continued)

FOREIGN PATENT DOCUMENTS

| CN | 104466307 A | 3/2015 |
| CN | 107394318 A | 11/2017 |

(Continued)

OTHER PUBLICATIONS

China Patent Office, First Office Action dated May 30, 2022, for corresponding Chinese application 202080000411.4.

*Primary Examiner* — Benny T Lee
(74) *Attorney, Agent, or Firm* — Houtteman Law LLC (57) ABSTRACT

The present disclosure provides a phase shifter and a manufacturing method thereof, and an antenna. The phase shifter includes a first substrate including a reference electrode, and a second substrate including a delay line and a bias line. An orthographic projection of the bias line on the first substrate and that of the delay line, at least partially overlap with that of the reference electrode respectively. The orthographic projection of the bias line on the first substrate does not overlap with that of the delay line. The delay line is used for transmitting a microwave signal and defining a microwave transmission region. When electrical signals are applied to the reference electrode, the delay line and the bias line, electric field areas formed respectively between the reference electrode and the delay line, and between the reference electrode and the bias line, cover the microwave transmission region.

18 Claims, 6 Drawing Sheets

(51) Int. Cl.
    *G02F 1/13*     (2006.01)
    *G02F 1/1343*     (2006.01)
    *H01Q 1/38*     (2006.01)

(52) U.S. Cl.
    CPC .............. *H01P 1/181* (2013.01); *H01P 1/184* (2013.01); *H01Q 1/38* (2013.01)

(58) Field of Classification Search
    USPC ......................................................... 333/161
    See application file for complete search history.

(56) References Cited

U.S. PATENT DOCUMENTS

2020/0243969 A1\*   7/2020   Fang ........................ H01Q 3/36
2021/0080765 A1    3/2021   Hu et al.

FOREIGN PATENT DOCUMENTS

| CN | 108563050 | A | 9/2018 |
| CN | 208654481 | U | 3/2019 |
| CN | 110137636 | A | 8/2019 |
| EP | 1128459 | A2 | 8/2001 |

\* cited by examiner

LIQUID CRYSTAL PHASE SHIFTER HAVING A DELAY LINE WITH A PLURALITY OF BIAS LINES ON TWO SIDES THEREOF AND AN ANTENNA FORMED THEREFROM

CROSS-REFERENCE OF RELATED APPLICATIONS

The present application is a US National Stage of International Application No. PCT/CN2020/081621, filed on Mar. 27, 2020, which is hereby incorporated by reference in its entirety.

TECHNICAL FIELD

The present disclosure relates to the field of communication technology, more particularly, to a phase shifter and a manufacturing method thereof, and an antenna.

BACKGROUND

A phase shifter is a device used for changing a phase of an electromagnetic wave signal. The ideal phase shifter has a very small insertion loss, and almost the same loss in different phase states, so as to achieve a balance of amplitude. There are several types of phase shifter such as electric control, light control, magnetic control, and mechanical control. The phase shifter, whose basic function is to change a transmission phase of a microwave signal by controlling a bias voltage, is divided into a digital phase shifter and an analog phase shifter (whose phase shift adjustment is continuous). The digital phase shifter is an important part of a phased array antenna, and is used for controlling a phase of each signal in the antenna array, allowing the radiation beam to be scanned electrically. The digital phase shifter is also commonly used in a digital communication system as a phase modulator.

SUMMARY OF THE INVENTION

The present disclosure aims to solve at least one of the technical problems existing in the prior art, and provides a phase shifter and a manufacturing method thereof, and an antenna.

In a first aspect, embodiments of the present disclosure provide a phase shifter, including: a first substrate and a second substrate arranged opposite each other, and a medium layer arranged between the first substrate and the second substrate; the first substrate including: a first base substrate, and a reference electrode arranged on a side of the first base substrate facing the medium layer; the second substrate including: a second base substrate, and a delay line arranged on a side of the second base substrate facing the medium layer, and an orthographic projection of the delay line on the first base substrate at least partially overlapping with the reference electrode on the first base substrate; and the delay line used for transmitting a microwave signal and defining a microwave transmission region; wherein the second substrate further includes: at least one bias line arranged on the side of the second base substrate facing the medium layer, wherein an orthographic projection of the at least one bias line on the first base substrate at least partially overlaps with the reference electrode on the first base substrate, and the orthographic projection of the at least one bias line on the first base substrate does not overlap with the orthographic projection of the delay line on the first base substrate; and when electrical signals are applied to the reference electrode, the delay line, and the at least one bias line, electric field areas formed respectively between the reference electrode and the delay line, and between the reference electrode and the at least one bias line, cover the microwave transmission region.

Optionally, the at least one bias line is electrically coupled with the delay line through a bias connection line.

Optionally, the at least one bias line and the bias connection line are arranged in a same layer and made of a same material.

Optionally, the second substrate further includes: a bias signal lead-in line arranged on the side of the second base substrate facing the medium layer, and the bias signal lead-in line is coupled with the delay line.

Optionally, the second substrate further includes: a bias signal lead-in line arranged on the side of the second base substrate facing the medium layer, and the bias signal lead-in line is coupled with the bias connection line and the delay line.

Optionally, the bias signal lead-in line and the at least one bias line are arranged in a same layer and made of a same material.

Optionally, the at least one bias line is provided on two sides of the delay line.

Optionally, a plurality of bias lines are provided on the two sides of the delay line, and the number of bias lines on one of the two sides of the delay line is a same as that on another of the two sides of the delay line.

Optionally, the number of bias lines provided on each of the two sides of the delay line is 2-8.

Optionally, the number of bias lines provided on each of the two sides of the delay line is 3.

Optionally, the at least one bias line has a first line spacing of 20 μm-75 μm.

Optionally, the delay line has a second line spacing of 100 μm-350 μm.

Optionally, each of the at least one bias line is arranged in parallel with the delay line.

Optionally, the at least one bias line has a conductivity less than 14500000 siemens/m.

Optionally, the at least one bias line is made of any one of indium tin oxide, nickel, tantalum nitride, chromium, indium oxide, and tin oxide.

In a second aspect, embodiments of the present disclosure provide a manufacturing method of a phase shifter including forming a first substrate and a second substrate, and forming a medium layer between the first substrate and the second substrate; wherein forming the first substrate includes: forming a pattern including a reference electrode on a first base substrate; and forming the second substrate includes: forming a pattern including a delay line and a bias line on a second base substrate; wherein an orthographic projection of the formed delay line on the first base substrate at least partially overlaps with the reference electrode on the first base substrate, and an orthographic projection of the formed bias line on the first base substrate at least partially overlaps with the reference electrode on the first base substrate; and when an electrical signal is applied to the delay line and the bias line, electric field areas are formed respectively between the reference electrode and the delay line, and between the reference electrode and the bias line, and the formed electric field areas cover a microwave transmission region.

In a third aspect, embodiments of the present disclosure provide an antenna including the above-mentioned phase shifter.

Optionally, the antenna further includes a patch electrode arranged on a side of the first base substrate away from the medium layer, and the reference electrode is provided with an opening at a position corresponding to the patch electrode.

DETAILED DESCRIPTION OF THE INVENTION

To make those skilled in the art better understand the technical solutions of the present disclosure, the present disclosure will be further described in detail below in conjunction with the accompanying drawings and embodiments.

Unless otherwise defined, the technical terms or scientific terms used in the present disclosure shall have the usual meanings understood by those with ordinary skills in the field to which this disclosure belongs. The words "first", "second" and other similar words used in the present disclosure do not indicate any order, quantity, or importance, but are only used to distinguish different components. Similarly, the words "a", "one", "the" or another similar word does not mean quantity limitation, but means that there is at least one. The words "include", "comprise" or another similar word means that an element or item appearing in front of the word encompasses an element or item listed behind the word, and its equivalents, but does not exclude other elements or items. The words "connected to", "coupled to" or other similar words are not limited to physical or mechanical connections, but may include electrical connections, whether directly or indirectly. The words "upper", "lower", "left", "right", etc. are only used to indicate relative position relationships. When an absolute position of a described object changes, a relative position relationship may also change accordingly.

The same reference numerals or the same reference designators denote the same elements throughout the specification.

Figure 1:
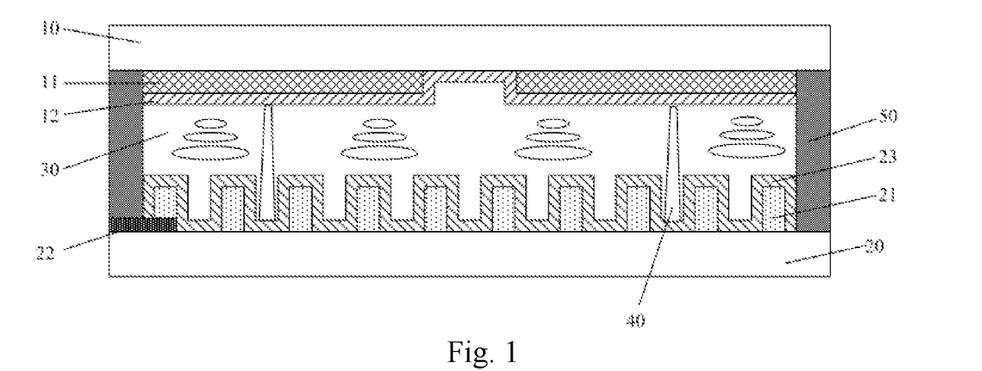
FIG. 1 is a schematic structural diagram of a phase shifter.
Figure 2:
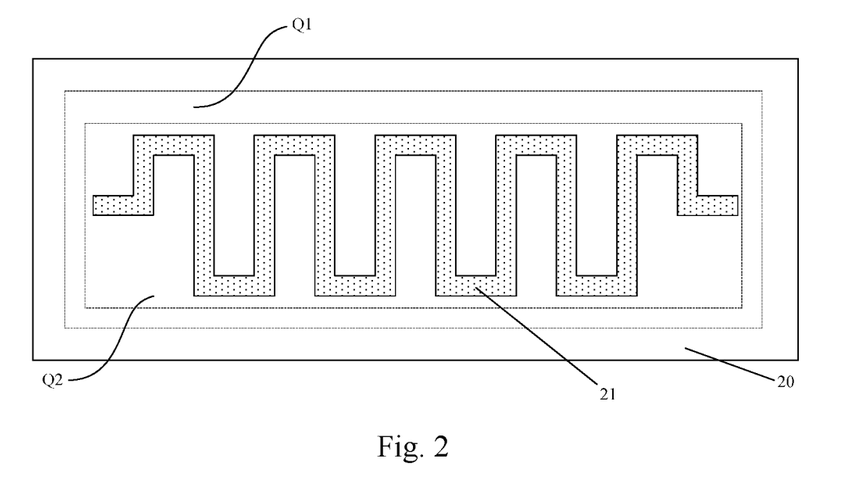
FIG. 2 is a top view of a structure of a second substrate of a phase shifter.

FIG. 1 illustrates a structure of a phase shifter, and FIG. 2 illustrates a structure of a second substrate of the phase shifter shown in FIG. 1. As shown in FIGS. 1 and 2, the phase shifter includes a first substrate and a second substrate arranged opposite each other, and a liquid crystal layer 30 (FIG. 1) arranged between the first substrate and the second substrate. The first substrate includes a first base substrate 10, and a ground electrode 11 arranged on a side of the first base substrate 10 facing the liquid crystal layer 30, and a first alignment layer 12 arranged on a side of the ground electrode 11 facing the liquid crystal layer 30, as shown in FIG. 1. The second substrate includes a second base substrate 20, a delay line 21 and a bias signal lead-in line 22 (FIG. 1) which are arranged on a side of the second base substrate 20 facing the liquid crystal layer 30, and a second alignment layer 23 (FIG. 1) arranged on a side of the delay line 21 and the bias signal lead-in line 22 facing the liquid crystal layer 30. An orthographic projection of the delay line 21 on the first base substrate 10 at least partially overlaps with the ground electrode 11 on the first base substrate 10. When the bias signal lead-in line 22 introduces a direct current (DC) bias voltage to the delay line 21, a DC electric field will be formed between the delay line 21 and the ground electrode 11, and thus an axial deflection will occur in the liquid crystal molecules of the liquid crystal layer 30, thereby changing a relative dielectric constant of the liquid crystal layer 30. A microwave signal travels along the delay line 21 and propagates between the ground electrode 11 and the delay line 21. As the relative dielectric constant of the liquid crystal layer 30 changes at this time, a phase of the microwave signal changes.

Of course, as shown in FIG. 1, the phase shifter not only includes the above components, but also includes other components, such as a supporting pillar 40 for maintaining a thickness of the liquid crystal cell (i.e., a cell thickness between the first substrate and the second substrate), and frame sealing glue 50 for sealing the liquid crystal cell, which will not be described one by one here.

The inventor found that the phase shifter shown in FIG. 1 has a spatial boundary (i.e., a microwave transmission region Q1 as shown in FIG. 2) during transmission of microwave signals far beyond an area where the delay line 21 is located. As shown in FIG. 2, a region Q2 of a DC electric field generated between the delay line 21 and the ground electrode 11 by applying a DC bias voltage is near the delay line 21, which causes that the electric field region Q2 where the relative dielectric constant of the liquid crystal layer 30 changes when the DC bias voltage is applied is too small, and the electric field region Q2 cannot completely cover the entire microwave transmission region Q1. Therefore, axial directions of the liquid crystal molecules far away from the conductive delay line 21 do not change at all, and do not participate in a phase shift process, and thus a phase shift angle is small. In order to achieve a certain phase shift angle, a length of the delay line 21 needs to be increased, which will inevitably lead to a problem of increased insertion loss.

To solve the above problem, the following technical solutions are provided in the embodiments of the present disclosure.

Before describing the following embodiments, it should be noted that a medium layer in the phase shifter provided in the following embodiments includes, but is not limited to, the liquid crystal layer 30, and it will be described only by taking the medium layer be the liquid crystal layer 30, as an example. A reference electrode in the phase shifter includes but is not limited to the ground electrode 11, as long as the reference electrode can form a current loop with the delay line 21. In the embodiments of the present disclosure, it will be described only by taking the reference electrode be the ground electrode 11 as an example.

Figure 3:
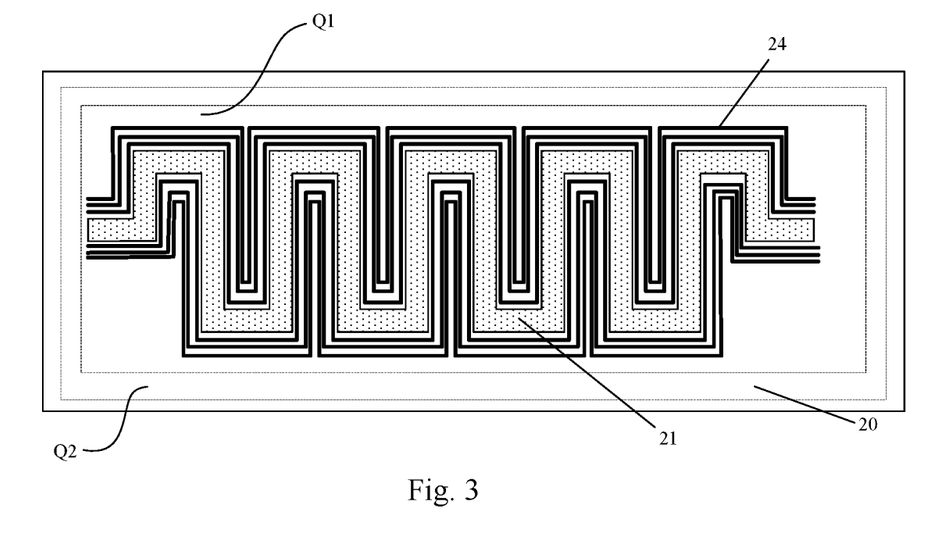
FIG. 3 is a top view of a second substrate of a phase shifter according to an embodiment of the present disclosure.
Figure 4:
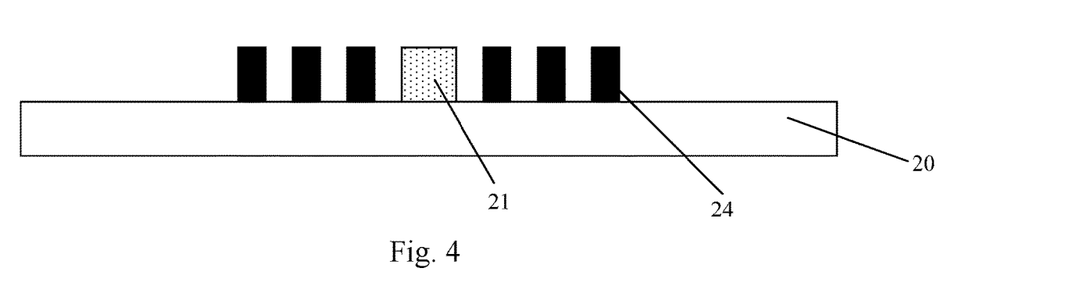
FIG. 4 is a side view of the second substrate shown in FIG. 3.

In the first aspect, as shown in FIGS. 1, 3 and 4, the embodiment of the present disclosure provides a phase shifter, which includes a first substrate and a second substrate arranged opposite each other, and a liquid crystal layer 30 arranged between the first substrate and the second substrate. The first substrate includes a first base substrate 10, and a ground electrode 11 arranged on a side of the first base substrate 10 facing the liquid crystal layer 30, as shown in FIG. 1. The second substrate includes a second base substrate 20, and a delay line 21 arranged on a side of the second base substrate 20 facing the liquid crystal layer 30, and an orthographic projection of the delay line 21 on the first base substrate 10 only partially overlaps with the ground electrode 11 on the first base substrate 10. When the delay line 21 is applied with a DC bias voltage and generates an electric field with the ground electrode 11, the electric field region Q2 (FIG. 3) determines an area where the liquid crystal molecules in the liquid crystal layer 30 are deflected. The microwave signal is transmitted along the delay line 21, and thus the delay line 21 defines the microwave transmission region Q1 (FIG. 3) of the microwave signal.

According to the embodiments of the present disclosure, a bias line 24 (FIGS. 3 and 4) is also provided on the side of the second base substrate 20 facing the liquid crystal layer 30, an orthographic projection of the bias line 24 on the first base substrate 10 at least partially overlaps with the ground electrode 11 on the first base substrate 10, and the orthographic projection of the bias line 24 on the first base substrate 10 does not overlap with the orthographic projection of the delay line 21 on the first base substrate 10. While applying a DC bias voltage to the delay line 21, the same DC bias voltage is applied to the bias line 24, so that both the delay line 21 and the bias line 24 can form electric fields with the ground electrode 11 respectively, and the formed electric field region Q2 can cover the microwave transmission region Q1 of the microwave signal. Therefore, when the microwave signal is transmitted along the delay line 21, the liquid crystal molecules of the liquid crystal layer 30 around the delay line 21 all may be deflected, and thus the microwave signal is fully phase-shifted, thereby increasing the phase shift angle of the phase shifter.

It should be noted here that, in the embodiments of the present disclosure, the bias line 24 is made of a high resistance material. When the DC bias voltage is applied to the bias line 24, the electric field formed by the bias line 24 and the ground electrode 11 is only used to drive the deflection of the liquid crystal molecules of the liquid crystal layer 30; and for the microwave signal transmitted in the phase shifter, it is equivalent to that the bias line 24 is broken. In other words, the microwave signal is only transmitted along the delay line 21.

In some embodiments, the bias line 24 has a conductivity less than 14500000 siemens/m, and it is better to select the bias line 24 with a lower conductivity value according to a size of the phase shifter.

In some embodiments, the bias line 24 is made of, but is not limited to, indium tin oxide (ITO), nickel (Ni), tantalum nitride (TaN), chromium (Cr), indium oxide ($In_2O_3$), or tin oxide ($Sn_2O_3$). Preferably, the bias line 24 is made of ITO.

In some embodiments, at least one bias line 24 is provided on each of two sides of the delay line 24, respectively.

In some embodiments, a plurality of bias lines 24 are located on each side of the delay line 21, and arranged in parallel with the delay line 21. The reason for this setting is to expand DC electric field regions on both sides of the delay line 21. Moreover, by arranging the bias lines 24 and the delay line 21 in parallel, an extension direction of a DC extended electric field formed by the bias lines 24 and the ground electrode 11 may be the same as that of the electric field formed by the delay line 21 and the ground electrode 11. As a result, the electric field region Q2 formed by the bias lines 24 and the delay line 21, to both of which the DC bias voltage is applied, and the ground electrode 11 is sufficient to cover the microwave transmission region Q1, and thus the microwave signal can be fully phase shifted.

Further, any two adjacent bias lines 24 located on a same side of the delay line 21 has a same spacing there between, and thus extended electric fields on both sides of the delay line 21 are uniform, thereby improving a phase shift effect of the microwave signal.

In addition, the numbers of bias lines 24 located on the two sides of the delay line 21 may be same, or different. In the embodiments of the present disclosure, as shown in FIG. 3, an example that the numbers of bias lines 24 located on the two sides of the delay line 21 are same is taken for description.

In some embodiments, the number of bias lines 24 located on each side of the delay line 21 is but is not limited to 2-8, which may be set according to a size of a specific phase shifter. Preferably, the number of the bias lines 24 located on each side of the delay line 21 is three. As shown in FIG. 3, in the embodiments of the present disclosure, an example that three bias lines 24 are located on each side of the delay line 21 is taken for description.

Figure 5:
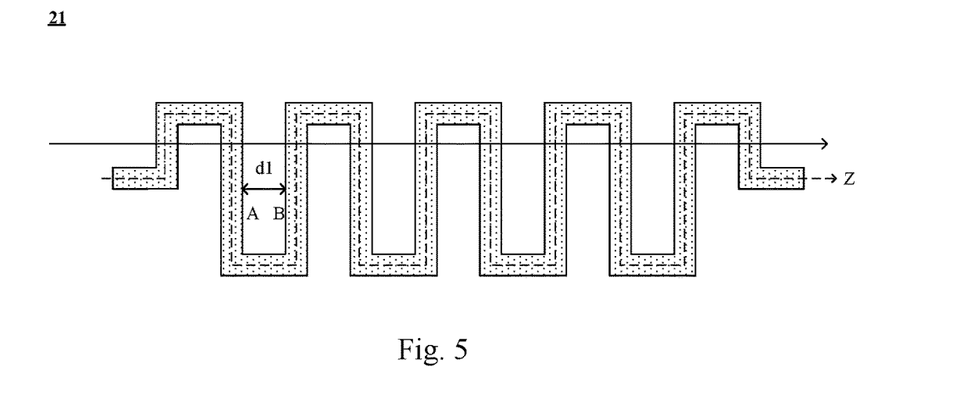
FIG. 5 is a schematic diagram of a delay line of a phase shifter according to an embodiment of the present disclosure.
Figure 6:
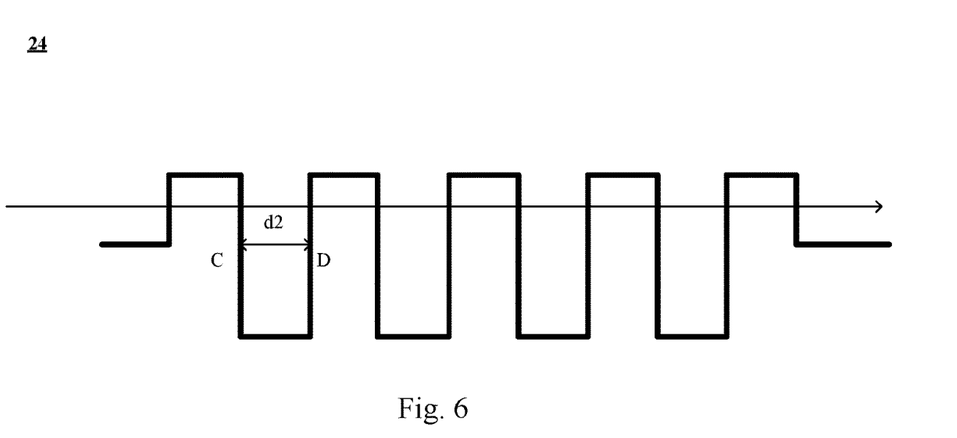
FIG. 6 is a schematic diagram of a bias line of a phase shifter according to an embodiment of the present disclosure.

In an example, the first base substrate 10 of the phase shifter is provided with the ground electrode 11 on the side facing the liquid crystal layer 30, the second base substrate 20 is provided with the delay line 21 in a shape of the Chinese character "弓" (FIG. 2) on the side facing the liquid crystal layer 30, and three delay lines 24 are provided on each side of the delay line 21. A line spacing of the delay line 21 refers to a shortest distance between two adjacent parts of the delay line 21 extending in a same direction. As shown in FIG. 5, point A is on the delay line 21, a normal line, which is perpendicular to the delay line 21 and intersects the delay line 21 at the point A, has intersection points with other parts of the delay line 21, point B is the one point closest to the point A among the intersection points, and the line spacing of the delay line 21 is the distance d1 between the points A and B; i.e., the distance d1 represents the line spacing of the delay line 21. A line spacing of the bias line 24 refers to a shortest distance between two adjacent parts of the bias line 24 extending in a same direction z. As shown in FIG. 6, point C is on the bias line 24, a normal line, which is perpendicular to the bias line 24 and intersects the bias line 24 at the point C, has intersection points with other parts of the bias line 24, point D is the one point closest to the point C among the intersection points, and the line spacing of the bias line 24 is the distance d2 between the points C and D; i.e., the distance d2 represents the line spacing of the bias line 24.

A line width of the delay line 21 is about 160 μm-240 μm, the line spacing of the delay line 21 is about 100 μm-350 μm, and a thickness of the delay line 21 is about 0.1 μm-100 μm. A line width of the bias line 24 is about 2 μm-8 μm, a thickness of the bias line 24 is 30 nm-2000 nm, and the line spacing of the bias line 24 is about 20 μm-75 μm. The spacing between the two adjacent bias lines 24, and a spacing between the delay line 21 and an adjacent bias line 24 are 15 μm-50 μm. A width of the microwave transmission region Q1 is 100 μm-500 μm. The cell thickness of the phase shifter between the first substrate and the second substrate is 70 μm-300 μm. A simulation result obtained from a simulation experiment according to the above parameter ranges shows that compared with a phase shifter without the bias line 24, the phase shift angle of the phase shifter in the embodiments of the present disclosure is increased by ⅓, and the insertion loss is reduced indirectly by ⅓.

Figure 7:
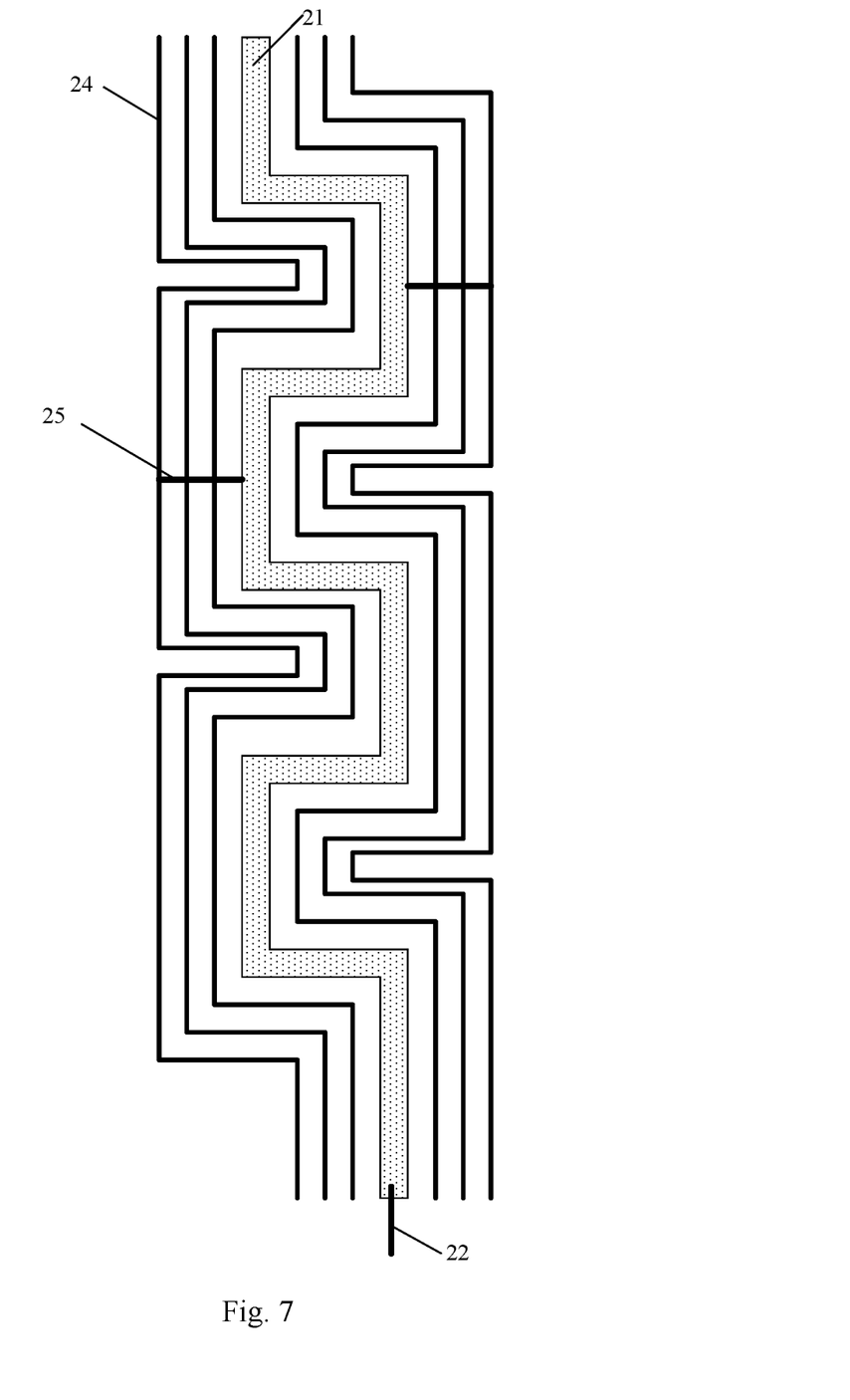
FIG. 7 is another top view of a second substrate of a phase shifter according to an embodiment of the present disclosure.

In some embodiments, the bias line 24 is electrically coupled with the delay line 21 through a bias connection line 25. Specifically, as shown in FIG. 7, when a plurality of bias lines 24 are provided on each side of the delay line 21, the plurality of bias lines 24 located on the same side of the delay line 21 are connected by one bias connection line 25. The bias lines 24 and the bias connection line 25 may be arranged in a same layer and made of a same material. Therefore, the bias lines 24 and the bias connection line 25 may be formed by one patterning process, thereby simplifying the process steps. In this case, the formed bias lines 24 and bias connection line 25 have an integral structure. Alternatively, the bias lines 24 and the bias connection line 25 may also be made of different materials. In this case, the bias connection line 25 and the delay line 21 may be made of a same material. When the delay line 21 is formed, a bias connection line 25 coupled with the delay line 21 is formed simultaneously, and the bias connection line 25 is also coupled with the bias lines 24. In addition, the bias connection line 25 may also be made of different materials from the bias line 24 and the delay line 21. In this case, an interlayer insulating layer may be provided between the bias connection line 25 and the bias line 24, and between the bias connection line 25 and the delay line 21, respectively. After that, the bias connection line 25 is respectively coupled with the bias line 24 and the delay line 21 through a via hole penetrating the interlayer insulating layer, thereby implementing the electrical connection of the bias line 24 and the delay line 21.

FIG. 7 only shows that the bias lines 24 and the bias connection line 25 are arranged in the same layer as an example. Further, in the FIG. 7, the bias connection line 25 is connected to a middle area of each bias line 24, but in fact, a connection position of the bias line 24 and the bias connection line 25 is not limited in the embodiments of the present disclosure.

Based on the above structures, the phase shifter may also include a bias signal lead-in line 22, which is coupled with one end of the delay line 21 and used for applying the DC bias voltage to the delay line 21. In some embodiments, the bias signal lead-in line 22 and the bias line 24 are arranged in a same layer and made of a same material. In this case, a separate patterning process is not required to form the bias signal lead-in line 22, thereby reducing the process cost and improving the production efficiency. Of course, the bias signal lead-in line 22 and the bias line 24 may also be formed of different materials, as long as the delay line 21 can be applied with the DC bias voltage. In the embodiments of the present disclosure, the material of the bias signal lead-in line 22 is the same as the material of the bias line 24, which does not constitute a limitation of the protection scope.

Figure 8:
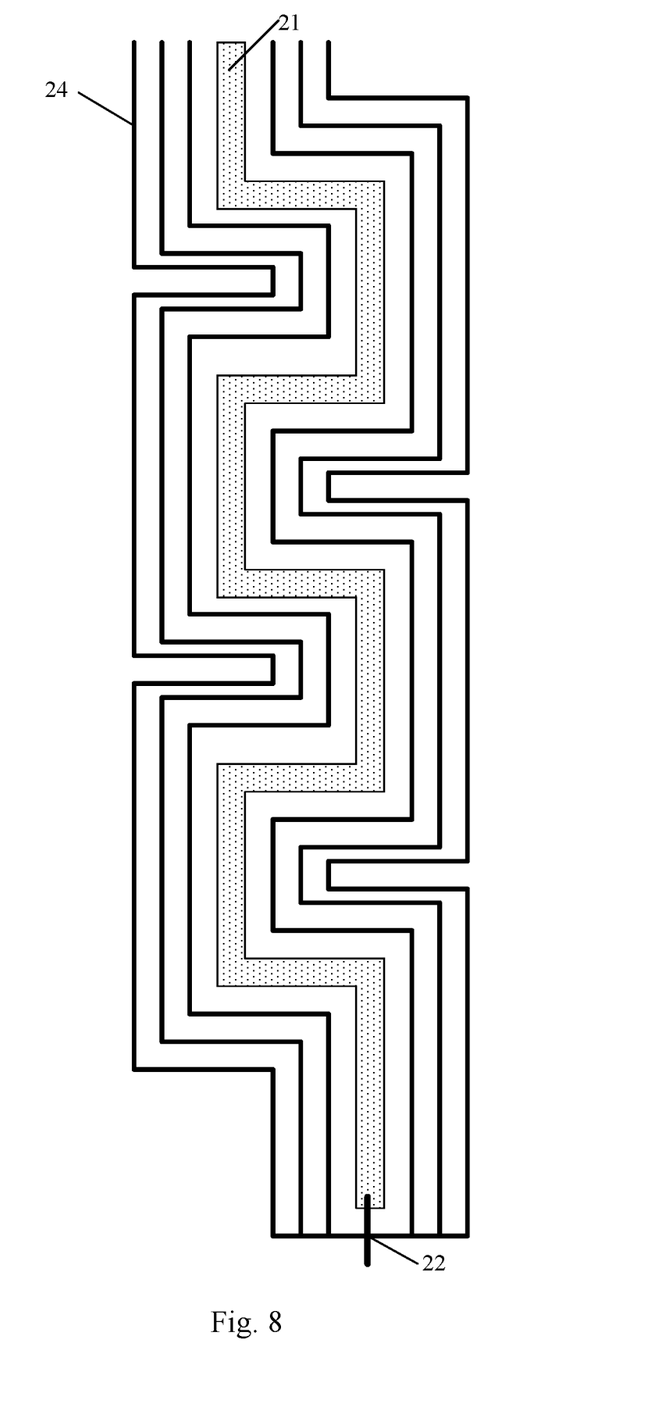
FIG. 8 is yet another top view of a second substrate of a phase shifter according to an embodiment of the present disclosure.

In some embodiments, as shown in FIG. 8, the phase shifter includes the bias signal lead-in line 22, which is connected to the delay line 21 and each bias line 24, respectively, for providing the DC bias voltage for the delay line 21 and each bias line 24.

The bias signal lead-in line 22 and the bias line 24 are arranged in a same layer and made of a same material. That is, the bias signal lead-in line 22 and the bias line 24 are formed simultaneously. In this case, the formed bias signal lead-in line 22 and bias line 24 have an integral structure, thereby reducing the process cost and improving the production efficiency.

In some embodiments, the delay line 21 may be made of a material with a high conductivity, such as copper, aluminum, or gold.

Figure 9:
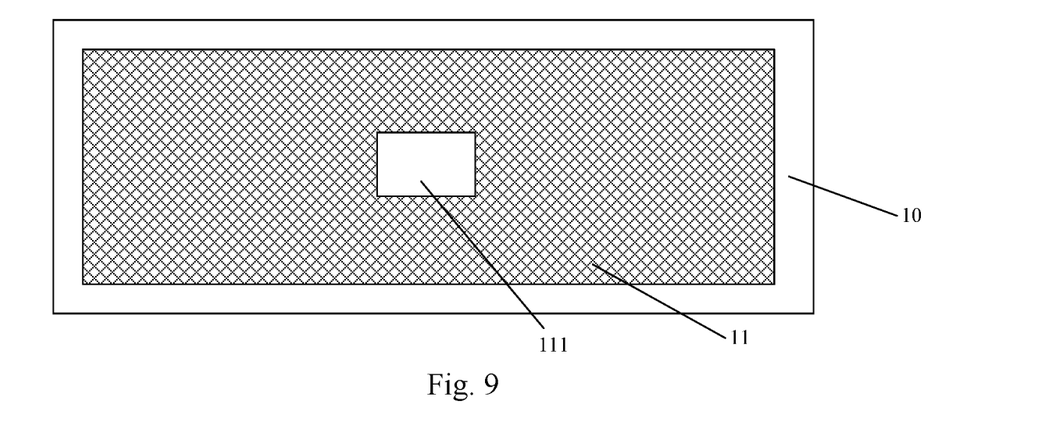
FIG. 9 is a top view of a first substrate of a phase shifter according to an embodiment of the present disclosure.

In some embodiments, as shown in FIG. 9, the ground electrode 11 includes, but is not limited to, a planar electrode, and is made of, but is not limited to, metals such as aluminum, silver, gold, chromium, molybdenum, nickel, or iron. It should be stressed that in order to enable an external microwave signal to be fed into the liquid crystal layer 30 of the phase shifter, the ground electrode 11 is provided with at least one opening 111.

In some embodiments, a first alignment layer 12 is provided on the side of the ground electrode 11 facing the liquid crystal layer 30, and a second alignment layer 23 is provided on the side of the delay line 21 facing the liquid crystal layer 30. The first alignment layer 12 and the second alignment layer 23 determine an initial pretilt angle of the liquid crystal molecules in the liquid crystal layer 30.

In some embodiments, the first base substrate 10 and the second base substrate 20 may be a glass substrate with a thickness of 100 μm-1000 μm, or a sapphire substrate. Alternatively, the first base substrate 10 and the second base substrate 20 may be a polyethylene terephthalate substrate, triallyl cyanurate substrate, or polyimide transparent flexible substrate with a thickness of 10 μm-500 μm. Specifically, the first base substrate 10 and the second base substrate 20 may be formed of high-purity quartz glass with extremely low dielectric loss. Compared with an ordinary glass substrate, the use of quartz glass for the first base substrate 10 and the second base substrate 20 can effectively reduce a loss of a microwave, and thus the phase shifter has a low power consumption and a high signal-to-noise ratio.

In some embodiments, the liquid crystal molecules in the liquid crystal layer 30 are positive liquid crystal molecules or negative liquid crystal molecules. It should be noted that in specific embodiments of the present disclosure, an angle between a long axis direction of the liquid crystal molecules and the second base substrate 20 is greater than 0 degrees, and less than or equal to 45 degrees when the liquid crystal molecules are the positive liquid crystal molecules; and the angle between the long axis direction of the liquid crystal molecules and the second base substrate 20 is greater than 45 degrees and less than 90 degrees when the liquid crystal molecules are the negative liquid crystal molecules, in specific embodiments of the present disclosure, which ensure that the deflection of the liquid crystal molecules causes the dielectric constant of the liquid crystal layer 30 to change, thereby achieving the purpose of phase shifting.

Of course, the phase shifter in the embodiments of the present disclosure not only includes the above-mentioned components, but also includes the supporting pillar 40 located on a side of the second alignment layer 23 facing the liquid crystal layer 30 to maintain the cell thickness of the liquid crystal cell formed by the first substrate and the second substrate. Moreover, frame sealing glue 50 is also provided between the first substrate and the second substrate for sealing the liquid crystal cell.

In the second aspect, embodiments of the present disclosure also provide a manufacturing method of a phase shifter, which can be used to manufacture the above-mentioned phase shifter. The method includes steps of forming a first substrate and a second substrate, and forming a liquid crystal layer 30 between the first substrate and the second substrate. The step of forming the first substrate includes: forming a pattern including a ground electrode 11 on a first base substrate 10; the step of forming the second substrate includes: forming a pattern including a delay line 21 and a bias line 24 on a second base substrate 20. An orthographic projection of the formed delay line 21 on the first base substrate 10 at least partially overlaps with the reference electrode 11 on the first base substrate 10, and an orthographic projection of the formed bias line 24 on the first base substrate 10 at least partially overlaps with the reference electrode 11 on the first base substrate 10. While applying a DC bias voltage to the delay line 21, the same DC bias voltage is applied to the bias line 24, so that both the delay line 21 and the bias line 24 can form electric fields with the ground electrode 11 respectively, and the formed electric field region can cover a microwave transmission region Q1 of a microwave signal. Therefore, when the microwave signal is transmitted along the delay line 21, the liquid crystal molecules of the liquid crystal layer 30 around the delay line 21 all may be deflected, and thus the microwave signal is fully phase-shifted, thereby increasing the phase shift angle of the phase shifter.

Figure 10:
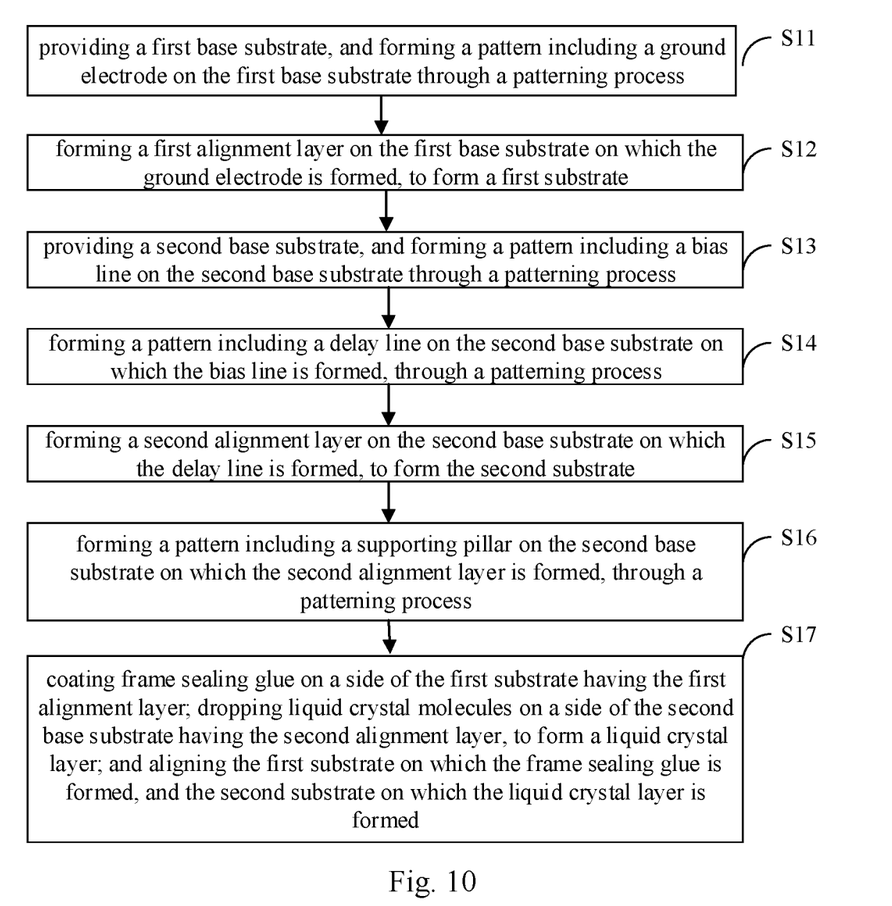
FIG. 10 is a flowchart of a manufacturing method of a phase shifter according to an embodiment of the present disclosure.

As shown in FIG. 10, the following provides an example of the manufacturing method of the phase shifter, so as to better understand the manufacturing method of the phase shifter in the embodiments of the present disclosure. It should be understood that the manufacturing method given below does not constitute a limitation on the protection scope of the embodiments of the present disclosure. There is no sequence for the preparation of the first substrate and the preparation of the second substrate. In the following description, take that the first substrate is preferably prepared as an example.

In step S11, a first base substrate 10 is provided, and a pattern including a ground electrode 11 is formed on the first base substrate 10 through a patterning process.

The first base substrate 10 may be a glass substrate, or a sapphire substrate; or a polyethylene terephthalate substrate, a triallyl cyanurate substrate, or a polyimide transparent flexible substrate may also be used. Specifically, the first base substrate 10 may be formed of high-purity quartz glass with extremely low dielectric loss. Compared with an ordinary glass substrate, the use of quartz glass for the first base substrate 10 can effectively reduce a loss of a microwave, and thus the phase shifter has a low power consumption and a high signal-to-noise ratio.

Specifically, the step S11 may include: cleaning the first base substrate 10; forming a first metal material layer on the first base substrate 10 by a method including but not limited to a magnetron sputtering method; coating glue on a side of the first metal material layer away from the first base substrate 10 by spin coating or spraying; and then performing processes of pre-baking, exposure, development, post-baking, wet etching or dry etching in sequence, to form the pattern including the ground electrode 11.

In step S12, a first alignment layer 12 is formed on the first base substrate 10 on which the ground electrode 11 is formed, to form a first substrate.

Specifically, the step S12 may include: printing an alignment liquid (i.e., PI liquid) on the first base substrate 10 on which the ground electrode 11 is formed, heating to evaporate a solvent, and performing processes of thermal curing, rubbing or a photo-alignment to form the first alignment layer 12, and then a preparation of the first substrate is completed.

In step S13, a second base substrate 20 is provided, and a pattern including a bias line 24 is formed on the second base substrate 20 through a patterning process. Of course, a bias signal lead-in line 22 and a bias connection line 25 connecting the bias lines 24 may also be formed while the bias line 24 is formed in this step.

The second base substrate 20 may be made of the same material as the first base substrate 10, and thus the description will not be repeated here. The bias line 24 may be made of a material with a relatively low conductivity, such as ITO. In the embodiments of the present disclosure, ITO is taken as an example for description.

Specifically, the step S13 may include: cleaning the second base substrate 20; forming an ITO material layer by a method including but not limited to a magnetron sputtering method; coating glue on the ITO material layer by spin coating or spraying; and then performing processes of pre-baking, exposure, development, post-baking, wet etching or dry etching in sequence, to form the pattern including the bias line 22, the bias signal lead-in line 22 and the bias connection line 25.

In step S14, a pattern including a delay line 21 is formed on the second base substrate 20 on which the bias line 24 is formed, through a patterning process.

Specifically, the step S14 may include: forming a second metal material layer on a layer where the bias line 24 is located by a method including but not limited to a magnetron sputtering method; coating glue on a side of the second metal material layer away from the second base substrate 20 by spin coating or spraying; and then performing processes of pre-baking, exposure, development, post-baking, wet etching or dry etching in sequence, to form the pattern including the delay line 21.

The material of the second metal material layer may be the same as that of the first metal material layer, and thus the description will not be repeated here.

In step S15, a second alignment layer 23 is formed on the second base substrate 20 on which the delay line 21 is formed, to form the second substrate.

Specifically, the step S15 may include: printing PI liquid on the second base substrate 20 on which the delay line 21 is formed, heating to evaporate a solvent, and performing processes of thermal curing, rubbing or a photo-alignment to form the second alignment layer 23, and then a preparation of the second substrate is completed.

In step S16, a pattern including a supporting pillar 40 is formed on the second base substrate 20 on which the second alignment layer 23 is formed, through a patterning process.

Specifically, the step S16 may include: coating glue on the second base substrate 20 on which the second alignment layer 23 is formed by spin coating or spraying; and then performing processes of pre-baking, exposure, development, post-baking, wet etching or dry etching in sequence, to form the pattern including the supporting pillar 40.

In step S17, frame sealing glue 50 is coated on a side of the first substrate having the first alignment layer 12; liquid crystal molecules are dropped on a side of the second base substrate 20 having the second alignment layer 23, to form the liquid crystal layer 30; and the first substrate on which the frame sealing glue 50 is formed, and the second substrate on which the liquid crystal layer 30 is formed are aligned.

Specifically, the step S17 may include: coating the frame sealing glue 50 on the side of the first substrate having the first alignment layer 12; dropping the liquid crystal molecules on the side of the second base substrate 20 having the second alignment layer 23, to form the liquid crystal layer 30; and transferring the first substrate and the second substrate to a vacuum cavity for aligning, vacuum pressing, ultraviolet (UV) curing, and thermal curing to form a liquid crystal cell. In step S17, a vacuum filling (VIF) process may also be used to form the liquid crystal cell. Specifically, the first substrate and the second substrate are vacuum cell aligned, cut, heated and vacuumed to remove water vapor, vacuum-filled, and sealed by the frame sealing glue 50; and finally, the frame sealing glue 50 is cured by UV and heat.

So far, the preparation of the phase shifter in the embodiments of the present disclosure is completed. Of course, the above steps are not all the steps for preparing the phase shifter, and the preparation of the phase shifter may further include a step of binding a Flexible Printed Circuit (FPC) and the liquid crystal cell after forming the liquid crystal cell of the phase shifter.

Figure 11:
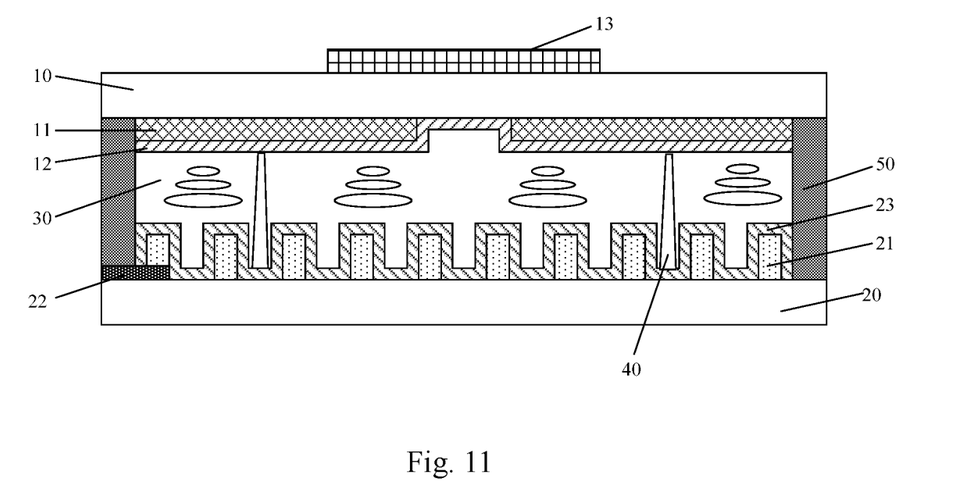
FIG. 11 is a schematic structural diagram of an antenna according to an embodiment of the present disclosure.

In the third aspect, as shown in FIG. 11, an antenna is provided according to the embodiments of the present disclosure. The antenna includes, but is not limited to, a receiving antenna. In the embodiments of the present disclosure, the receiving antenna is taken as an example for description. The antenna includes the above-mentioned phase shifter, and a patch electrode 13 arranged on a side of the first base substrate 10 away from the ground electrode 11; and an opening 111 (FIG. 9) is provided on the ground electrode 11 at a position corresponding to the patch electrode 13. The patch electrode 13 is used for feeding a microwave signal into the liquid crystal layer 30 of the phase shifter through the opening 111 of the ground electrode 11.

The antenna of the embodiments of the present disclosure is also provided with the bias line on the side of the second base substrate 20 facing the liquid crystal layer 30, and the orthographic projection of the bias line on the first base substrate 10 at least partially overlaps with the ground electrode 11 on the first base substrate 10. Further, while applying the DC bias voltage to the delay line 21, the same DC bias voltage is applied to the bias line, so that both the delay line 21 and the bias line can form electric fields with the ground electrode 11 respectively, and the formed electric field region can cover the microwave transmission region Q1 of the microwave signal. Therefore, the liquid crystal molecules of the liquid crystal layer 30 around the delay line 21 all may be deflected when the microwave signal is transmitted along the delay line 21, and thus the microwave signal is fully phase-shifted, thereby increasing the phase shift angle of the phase shifter.

It can be understood that the above implementations are merely exemplary implementations used to illustrate the principle of the present disclosure, but the present disclosure is not limited thereto. For those of ordinary skill in the art, various modifications and improvements can be made without departing from the spirit and essence of the present disclosure, and these modifications and improvements also fall within the protection scope of the present disclosure.

The invention claimed is:

1. A phase shifter, comprising: a first substrate and a second substrate arranged opposite each other, and a medium layer arranged between the first substrate and the second substrate; the first substrate comprising: a first base substrate, and a reference electrode arranged on a side of the first base substrate facing the medium layer; the second substrate comprising: a second base substrate, and a delay line arranged on a side of the second base substrate facing the medium layer, and an orthographic projection of the delay line on the first base substrate at least partially overlapping with the reference electrode on the first base substrate; and the delay line being used for transmitting a microwave signal and defining a microwave transmission region; wherein the second substrate further comprises: at least one bias line arranged on the side of the second base substrate facing the medium layer, wherein an orthographic projection of the at least one bias line on the first base substrate at least partially overlaps with the reference electrode on the first base substrate, and the orthographic projection of the at least one bias line on the first base substrate does not overlap with the orthographic projection of the delay line on the first base substrate; and when electrical signals are applied to the reference electrode, the delay line and the at least one bias line, electric field areas formed respectively between the reference electrode and the delay line, and between the reference electrode and the at least one bias line, cover the microwave transmission region, wherein the at least one bias line comprises a plurality of bias lines, and the plurality of bias lines are provided on two sides of the delay line, and the number of bias lines on one of the two sides of the delay line is same as that on another of the two sides of the delay line.

2. The phase shifter of claim 1, wherein the at least one bias line is electrically coupled with the delay line through a bias connection line.

3. The phase shifter of claim 2, wherein the at least one bias line and the bias connection line are arranged in a same layer and made of a same material.

4. The phase shifter of claim 2, wherein the second substrate further comprises: a bias signal lead-in line arranged on the side of the second base substrate facing the medium layer, and the bias signal lead-in line is coupled with the delay line.

5. The phase shifter of claim 2, wherein the second substrate further comprises: a bias signal lead-in line arranged on the side of the second base substrate facing the medium layer, and the bias signal lead-in line is coupled with the bias connection line and the delay line.

6. The phase shifter of claim 5, wherein the bias signal lead-in line and the at least one bias line are arranged in a same layer and made of a same material.

7. An antenna comprising the phase shifter of claim 1.

8. The antenna of claim 7, further comprising a patch electrode arranged on a side of the first base substrate away from the medium layer, wherein the reference electrode is provided with an opening at a position corresponding to the patch electrode.

9. The phase shifter of claim 1, wherein the number of bias lines provided on each of the two sides of the delay line is in a range of 2-8.

10. The phase shifter of claim 1, wherein the number of bias lines provided on each of the two sides of the delay line is 3.

11. The phase shifter of claim 1, wherein the at least one bias line has a first line spacing of 20 μm-75 μm.

12. The phase shifter of claim 1, wherein the delay line has a second line spacing of 100 μm-350 μm.

13. The phase shifter of claim 1, wherein each of the at least one bias line is arranged in parallel with the delay line.

14. The phase shifter of claim 1, wherein the at least one bias line has a conductivity less than 14500000 siemens/m.

15. The phase shifter of claim 1, wherein the at least one bias line is made of any one of indium tin oxide, nickel, tantalum nitride, chromium, indium oxide, and tin oxide.

16. The phase shifter of claim 1, wherein the second substrate further comprises: a bias signal lead-in line arranged on the side of the second base substrate facing the medium layer, and the bias signal lead-in line is coupled with the delay line.

17. The phase shifter of claim 16, wherein the bias signal lead-in line and the at least one bias line are arranged in a same layer and made of a same material.

18. A manufacturing method of a phase shifter, comprising: forming a first substrate and a second substrate, and forming a medium layer between the first substrate and the second substrate; wherein
- forming the first substrate comprises: forming a pattern comprising a reference electrode on a first base substrate; and
- forming the second substrate comprises: forming a pattern comprising a delay line and a bias line on a second base substrate; wherein an orthographic projection of the formed delay line on the first base substrate at least partially overlaps with the reference electrode on the first base substrate, and an orthographic projection of the formed bias line on the first base substrate at least partially overlaps with the reference electrode on the first base substrate; and when an electrical signal is applied to the delay line and the bias line, electric field areas are formed respectively between the reference electrode and the delay line, and between the reference electrode and the bias line, and the formed electric field areas cover a microwave transmission region,
- wherein the bias line comprises a plurality of bias lines, and the plurality of bias lines are provided on two sides of the delay line, and the number of bias lines on one of the two sides of the delay line is same as that on another of the two sides of the delay line.

* * * * *